UNITED STATES PATENT OFFICE.

HAROLD EDWARD SHERWIN HOLT, OF FARNBOROUGH, ENGLAND.

ILLUMINATING DEVICE FOR USE ON AIRCRAFT.

1,227,441. Specification of Letters Patent. Patented May 22, 1917.

Application filed January 4, 1916. Serial No. 70,316.

*To all whom it may concern:*

Be it known that I, HAROLD EDWARD SHERWIN HOLT, a subject of the King of Great Britain and Ireland, residing at The Grange, Farnborough, Hampshire, England, have invented certain new and useful Improvements in Illuminating Devices for Use on Aircraft, of which the following is a specification.

This invention for an improved illuminating device for use on aircraft has for its object to facilitate the landing of aeroplanes or similar aircraft at night and consists of a flare or illuminating body, means for suspending same from the aeroplane or the like, and igniting means under the control of the airman, whereby he can ignite the flare when descending to enable him to avoid obstructions and land with greater safety in the dark.

In one practical form of the invention the flare is attached to a suspending strip of metal which is secured by a clamp on its upper end to some part of the aircraft so as to hang therefrom with the narrow edges directed fore and aft in which direction the suspending strip is pivoted to swing on the clamp but is preferably prevented from swinging athwart the machine so as to follow the movements of the machine when banking.

The suspending strip with flare may conveniently be clamped to the after edge of one of the wings or planes by a clamp having a pair of jaws and a clamping screw, or one of the flares may be suspended from each wing or the suspending strip may be attached to the fuselage so as to hang between the skids as will be readily understood.

The flare material is made up in cylindrical form, one or more cylinders of this material being fixed to the lower end of each suspending strip by sheet metal clamping bands riveted to the suspending strip and provided with bolts and fly nuts.

A suitable electric igniter is connected with the lower end of the flare, the suspending strip being provided with terminals for the attachment of the connections which are led to a battery with switch on the machine.

The accompanying drawing is a side elevation of an illuminating device constructed according to this invention.

As shown, two cylinders $a$ of flare material as for instance Bengal light or the like, are fixed in a double clamp $b$ formed of suitably bent strips of sheet metal with clamping bolts and fly nuts $b^1$ and attached by rivets at $c$ to a suspending strip $d$ forked at its lower end to straddle the two sides of the clamp.

The suspending strip $d$ which is made thin in the fore and aft direction to offer little resistance to the air and may be stamped with a longitudinal stiffening rib as illustrated, is attached at its upper end to a clamping head $e$ with jaws $e^1$ adapted to be applied to the after edge of one of the wings or planes of an aeroplane and fixed by a clamping screw $f$.

Ignition of the flare is effected electrically through a suitable igniter connected with a fuse $g$ at the lower end of the flare and supplied with current through wires $h$ with terminals $i$ from which other wires, not shown, are led to an igniting battery, with switch suitably located on the aircraft.

H. E. S. HOLT.
ILLUMINATING DEVICE FOR USE ON AIRCRAFT.
APPLICATION FILED JAN. 4, 1916.
1,227,441.
Patented May 22, 1917.
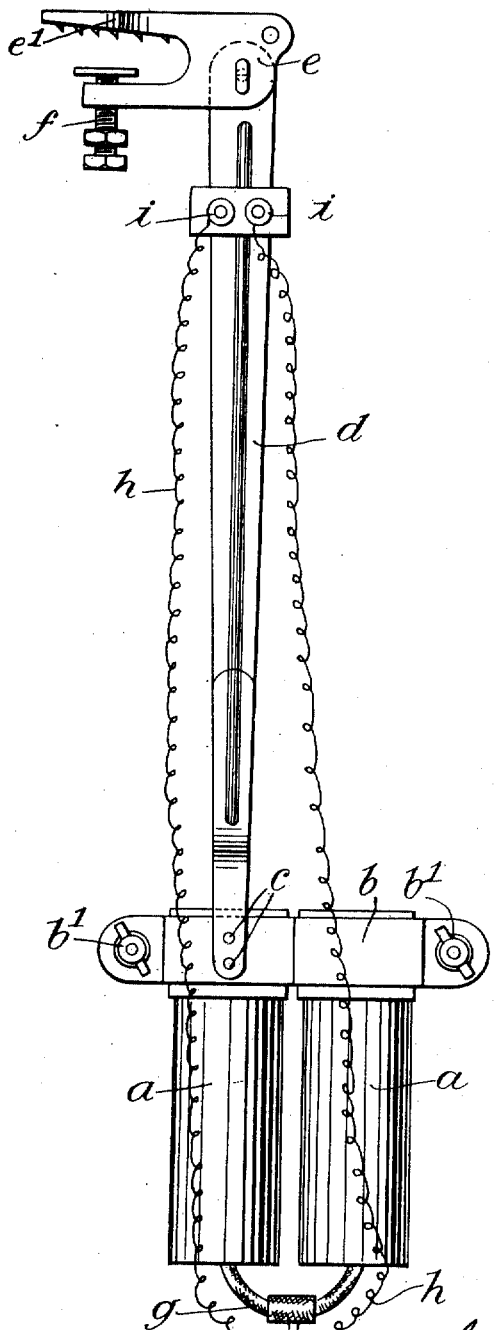

What I claim and desire to secure by Letters Patent is:—

In an apparatus for facilitating the landing of air-craft at night, in combination, a clamp adapted to be clamped to the edge of the wings or planes of the air-craft, a suspending strip attached with one of its ends to said clamp, a double clamp secured to the other, forked end of said strip, a plurality of Bengal light cylinders, means for securing said cylinders between the two members of the clamp, a fuse at the outer end of said cylinders, and electrical connections allowing a lighting of said fuse and light, substantially as described and for the purpose set forth.

In testimony whereof I have affixed my signature.

HAROLD EDWARD SHERWIN HOLT.

Copies of this patent may be obtained for five cents each, by addressing the "Commissioner of Patents, Washington, D. C."